(12) United States Patent
Bonanno et al.

(10) Patent No.: US 8,874,885 B2
(45) Date of Patent: Oct. 28, 2014

(54) MITIGATING LOOKAHEAD BRANCH PREDICTION LATENCY BY PURPOSELY STALLING A BRANCH INSTRUCTION UNTIL A DELAYED BRANCH PREDICTION IS RECEIVED OR A TIMEOUT OCCURS

(75) Inventors: James J. Bonanno, Wappingers Falls, NY (US); David S. Hutton, Tallahassee, FL (US); Brian R. Prasky, Wappingers Falls, NY (US); Anthony Saporito, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 1570 days.

(21) Appl. No.: 12/029,543

(22) Filed: Feb. 12, 2008

(65) Prior Publication Data

US 2009/0204797 A1 Aug. 13, 2009

(51) Int. Cl.
*G06F 9/30* (2006.01)
*G06F 9/38* (2006.01)

(52) U.S. Cl.
CPC ............ *G06F 9/3844* (2013.01); *G06F 9/3836* (2013.01); *G06F 9/3806* (2013.01)
USPC .......................................... 712/239; 712/214

(58) Field of Classification Search
CPC . G06F 9/30058; G06F 9/3836; G06F 9/3844; G06F 9/3806
USPC .......................... 712/233, 234, 238, 239, 214
See application file for complete search history.

(56) References Cited

U.S. PATENT DOCUMENTS

| | | | |
|---|---|---|---|
| 5,604,877 A * | 2/1997 | Hoyt et al. .................... | 712/243 |
| 5,761,490 A * | 6/1998 | Hunt ............................. | 712/239 |
| 6,263,427 B1 * | 7/2001 | Cummins et al. ............. | 712/236 |
| 7,281,120 B2 | 10/2007 | Dieffenderfer et al. | |
| 2004/0186960 A1 | 9/2004 | Poggio | |
| 2005/0120193 A1 * | 6/2005 | Emma et al. .................. | 712/240 |
| 2006/0190707 A1 | 8/2006 | McIlvaine et al. | |

OTHER PUBLICATIONS

Shen et al., "Modern Processor Design—Fundamentals of Superscalar Processors", McGraw-Hill, 2005, pp. 230-231.*
Daniel Jimenez, "Delay-Sensitive Branch Predictors for Future Technologies", PhD Thesis, University of Texas at Austin, Jan. 2002, pp. 1-18, 129-135.
z/Architecture Principles of Operation, International Business Machines Corporation, SA22-7832-05, Sixth Edition (Apr. 2007), pp. 5-9, 7-23 through 7-31, C-1 through C-4.

* cited by examiner

*Primary Examiner* — David J Huisman
(74) *Attorney, Agent, or Firm* — Cantor Colburn LLP; Margaret McNamara

(57) ABSTRACT

Embodiments relate to mitigation of lookahead branch predication latency. An aspect includes receiving an instruction address in an instruction cache for fetching instructions in a microprocessor pipeline. Another aspect includes receiving the instruction address in a branch presence predictor coupled to the microprocessor pipeline. Another aspect includes determining, by the branch presence predictor, presence of a branch instruction in the instructions being fetched, wherein the branch instruction is predictable by the branch target buffer, and any indication of the instruction address not written to the branch target buffer is also not written to the branch presence predictor. Another aspect includes, based on receipt of an indication that the branch instruction is present from the branch presence predictor, holding the branch instruction. Another aspect includes, based on receipt of a branch prediction corresponding to the branch instruction from the branch target buffer, releasing said held branch instruction to the pipeline.

18 Claims, 4 Drawing Sheets

MITIGATING LOOKAHEAD BRANCH PREDICTION LATENCY BY PURPOSELY STALLING A BRANCH INSTRUCTION UNTIL A DELAYED BRANCH PREDICTION IS RECEIVED OR A TIMEOUT OCCURS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to processor pipelines, branch prediction and branch prediction latency, and particularly to a system and method for mitigating lookahead branch prediction latency with branch presence prediction at the time of instruction fetching.

2. Description of Background

Branch prediction is a performance-critical component of a pipelined high frequency microprocessor and is used to predict the direction (taken vs. not taken) and the target address of branch instructions. Branch prediction is beneficial because it allows processing to continue along a branch's predicted path rather than having to wait for the outcome of the branch to be determined. An additional penalty is incurred only if a branch is mis-predicted.

A Branch Target Buffer (BTB) is a structure that stores branch and target information. Other structures such as a Branch History Table (BHT) and Pattern History Table (PHT) can be included to store information used for branch direction prediction.

The BTB can be searched in parallel to and independently from instruction fetching to find upcoming branches, in which case it is called lookahead branch prediction. Lookahead branch prediction can be implemented in such a way that branch prediction is usually ahead of instruction fetching and decode. In such a configuration, branch predictions steer instruction fetching. It is an effective instruction pre-fetch mechanism particularly if the BTB footprint is bigger than that of the first level instruction cache. There are times however when the BTB search falls behind, which most frequently happens after restart conditions when there is a race between the BTB trying to predict the first upcoming branch instruction and the instruction fetch logic trying to fetch and deliver the new instruction stream. It is also possible for the BTB to fall behind if its throughput cannot keep up with the number of branches in the instruction stream. In such cases when the BTB falls behind and is not able to provide branch prediction information for branch instructions, such branches are predicted using a less accurate predictor. If such branches are guessed taken, instruction fetching is restarted once the target address of the branch is computed.

Current solutions to reduce or mitigate branch prediction delay include hierarchical predictors, which are implemented solely in hardware, and cooperative predictors, which rely on hardware support for compiler optimizations based on profiling. Hierarchical predictors include two level caching, overriding predictors, and cascading. All of these approaches involve combining small-and-fast predictors with large-and-slow predictors. In a lookahead predictor as described above, two level caching can help reduce prediction latency, but typically does not eliminate cases where the BTB falls behind. An overriding predictor combines a small and fast first level predictor that can be overridden by a larger and slower predictor. Typically, an overriding predictor can add complexity and may not eliminate latency problems in a lookahead design. An overriding predictor could reduce latency problems if the first level BTB predictor were smaller than it otherwise would be, but doing so would also decrease the pre-fetching benefit and prediction accuracy provided from the BTB. Cascading accesses different latency predictors in parallel and uses the most accurate predictor available in time for the branch. As with the previous two approaches, this approach may not solve the latency problem in a lookahead predictor. Implementing a cascading structure in a lookahead predictor is not straightforward because the prediction needs to be used immediately to redirect the BTB search and deciding whether to redirect the prediction search with the quickest prediction or to wait for the slowest prediction is difficult.

SUMMARY OF THE INVENTION

An exemplary embodiment includes a method, system, and computer program product for mitigating lookahead branch prediction latency. An aspect includes receiving an instruction address in an instruction cache for fetching instructions in the microprocessor pipeline. Another aspect includes receiving the instruction address in a branch presence predictor coupled to the microprocessor pipeline. Another aspect includes determining, by the branch presence predictor, presence of a branch instruction in the instructions being fetched, wherein the branch instruction is predictable by the branch target buffer, and any indication of the instruction address not written to the branch target buffer is also not written to the branch presence predictor. Another aspect includes, based on receipt of an indication that the branch instruction is present from the branch presence predictor, holding the branch instruction. Another aspect includes, based on receipt of a branch prediction corresponding to the branch instruction from the branch target buffer, releasing said held branch instruction to the pipeline for execution.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

An exemplary embodiment includes a system and method implementing lookahead branch prediction using a BTB, in which branch presence prediction can be done at the time instructions are fetched. In an exemplary embodiment, the same address sent to the instruction cache for fetching instructions is also sent to the branch presence predictor (BPP). The BPP predicts whether there are any BTB-predictable branches in the locations being fetched and potentially even indicate the exact or approximate locations within the instruction stream that correspond to branch instructions. When instructions are being extracted from the data returned from the instruction cache, any of them predicted by the BPP are stalled until either a branch prediction from the BTB is available, or a timeout has occurred. The BPP allows the BTB to catch up to fetching and instruction delivery. The accurate prediction from the BTB can be used instead of having to rely on a less accurate prediction. In an exemplary embodiment, there is no additional need to re-steer the instruction fetching and branch prediction logic. Furthermore, branches that have latency problems can be identified and therefore installed into any special mechanisms that may exist to prevent the latency problem on future occurrences of the branch.

Figure 1:
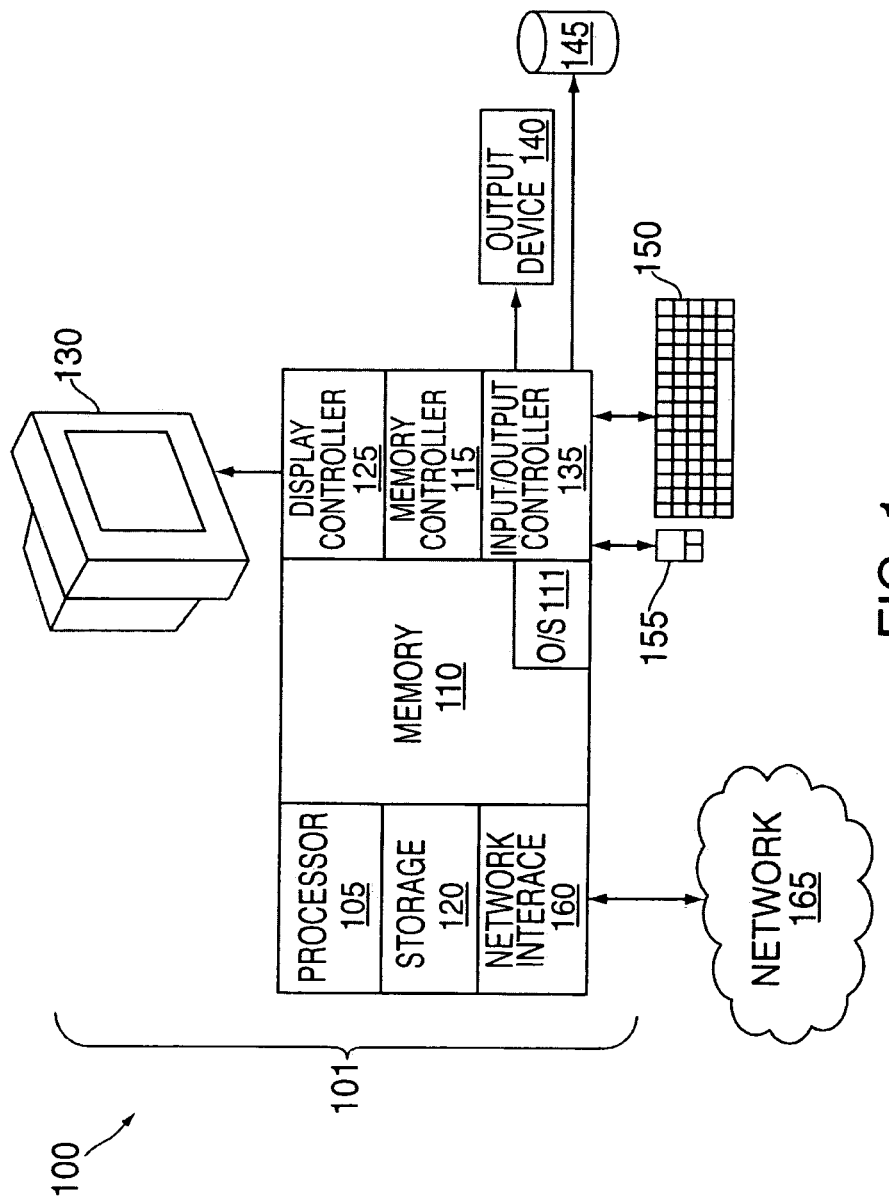
FIG. 1 illustrates a block diagram of a system in accordance with an exemplary embodiment.

FIG. 1 illustrates a block diagram of a system 100 for mitigating lookahead branch prediction latency with branch presence prediction at the time of instruction fetching. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 includes a suitable operating system (OS) 111. The operating system 111 essentially controls the execution of other computer programs and provides scheduling, input-output control, file and data management, memory management, and communication control and related services.

The branch prediction latency mitigation methods described herein are part of a microprocessor.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions. The computer 101 can include any suitable computer readable medium 120 for use by or in connection with any computer related system or method.

In an exemplary embodiment, where the branch prediction latency mitigation methods are implemented in hardware, the branch prediction latency mitigation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
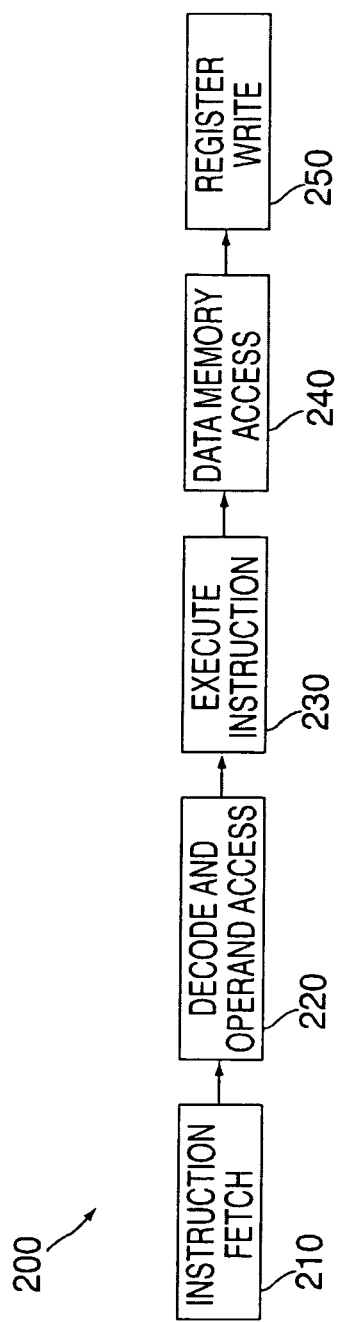
FIG. 2 illustrates a block diagram of a processor instruction pipeline system in which the exemplary branch prediction latency mitigation methods can be implemented in accordance with an exemplary embodiment.

FIG. 2 illustrates a block diagram of a processor instruction pipeline system 200 in which the exemplary branch prediction latency mitigation methods can be implemented in accordance with an exemplary embodiment. As described above, the simplest way to speed up the processor 105 operation is to pipeline it. Pipelining is one specific form of parallelism, where the execution of several instructions can be interleaved on the same hardware. In an exemplary embodiment, the pipeline system includes five stages: (1) Instruction fetch 210; (2) Decode and operand access 220; (3) Execute instruction 230; (4) Data memory access 240; and (5) Register write 250. In an exemplary embodiment, the instruction fetch 210 stage fetches instructions to be processed. The Decode and operand access 220 stage decodes the instruction and gathers the source operands needed by the instruction being processed. The Execute instruction 230 stage performs the function of the instructions that can include arithmetic logic unit (ALU) operations. The Data memory access 240 stage performs any data memory access functions associated with the instruction. The Write Register write 250 stage writes the appropriate result value into the register file. As described above, the pipeline system 200 can be enhanced by the BPP allowing the BTB to catch up to fetching and instruction delivery. The accurate prediction from the BTB can be used instead of having to rely on a less accurate prediction. As such, there is no additional need to re-steer the instruction fetching and branch prediction logic. Furthermore, branches that have latency problems can be identified and therefore installed into any special mechanisms that may exist to prevent the latency problem on future occurrences of the branch.

Figure 3:
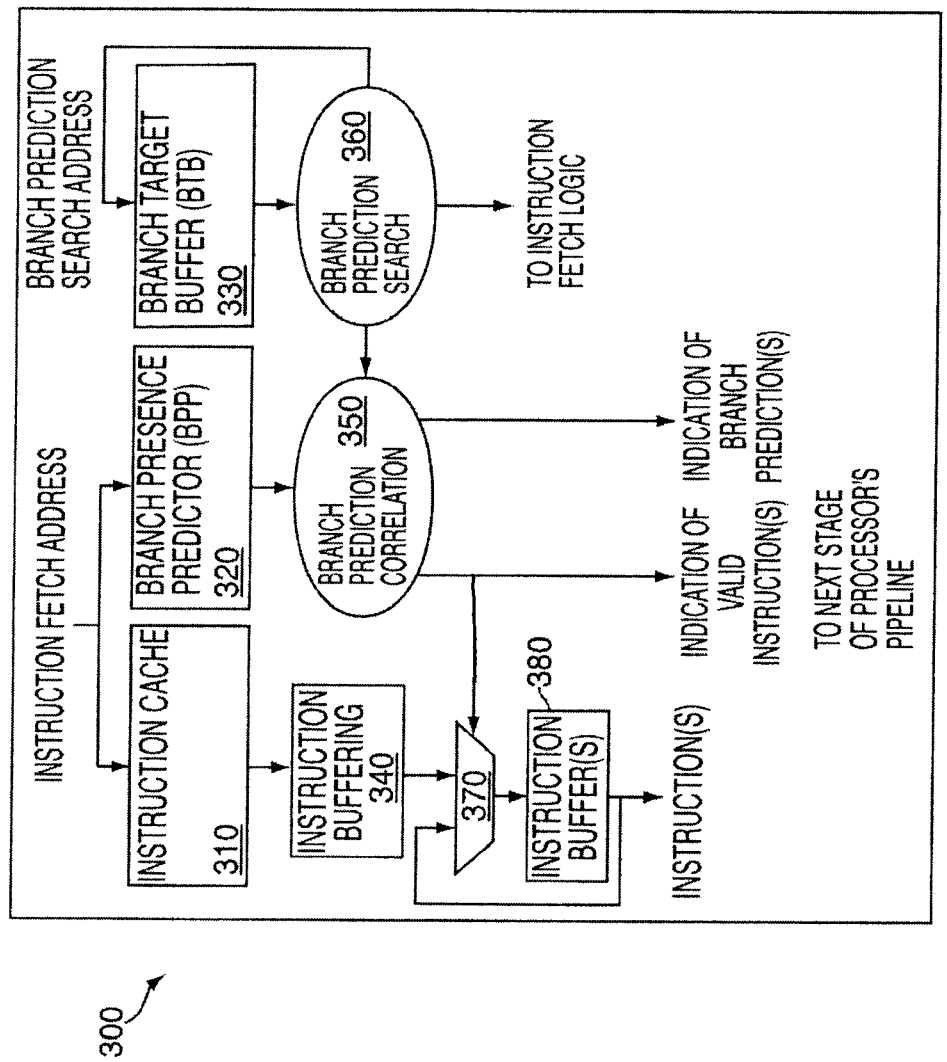
FIG. 3 illustrates instruction fetch stages of the pipeline of FIG. 2 and shows the branch presence predictor and asynchronous lookahead branch predictor in accordance with an exemplary embodiment.

FIG. 3 illustrates a stage 300 of the pipeline 200 of FIG. 2 in which the branch prediction latency mitigation methods may be implemented in accordance with an exemplary embodiment. In an exemplary embodiment, the stage 300 includes an instruction cache 310 coupled to an instruction buffer 340. The instruction buffer 340 can also be coupled to a multiplexer 370, which can further be coupled to additional instruction buffers 380. In an exemplary embodiment, the stage can further include a branch presence predictor (BPP) 320, which can be coupled to branch prediction correlation logic 350. In an exemplary embodiment, the branch prediction correlation logic 350 can be coupled to the multiplexer 370. The stage 300 can further include a branch target buffer (BTB) 330, which can be coupled to branch prediction search logic 360. The branch prediction search logic 360 can further be coupled to the branch prediction correlation logic 350. It is appreciated by those skilled in the art that the multiplexer 370 can be implemented to multiplex instructions received from the instruction cache 310, which have been buffered in the instruction buffer 340, and any further buffered instructions received from the additional instruction buffer 380; valid instructions are indicated to the multiplexer 370 by a release signal received from the branch prediction correlation logic 350 The instructions can then be further passed along in the pipeline 200. As further described herein, the branch prediction correlation logic 350 can pass both an indication of valid instructions and an indication of branch predictions into the pipeline 200. In addition, the branch prediction search logic 360 can pass results to instruction fetch logic in the pipeline 200.

Figure 4:
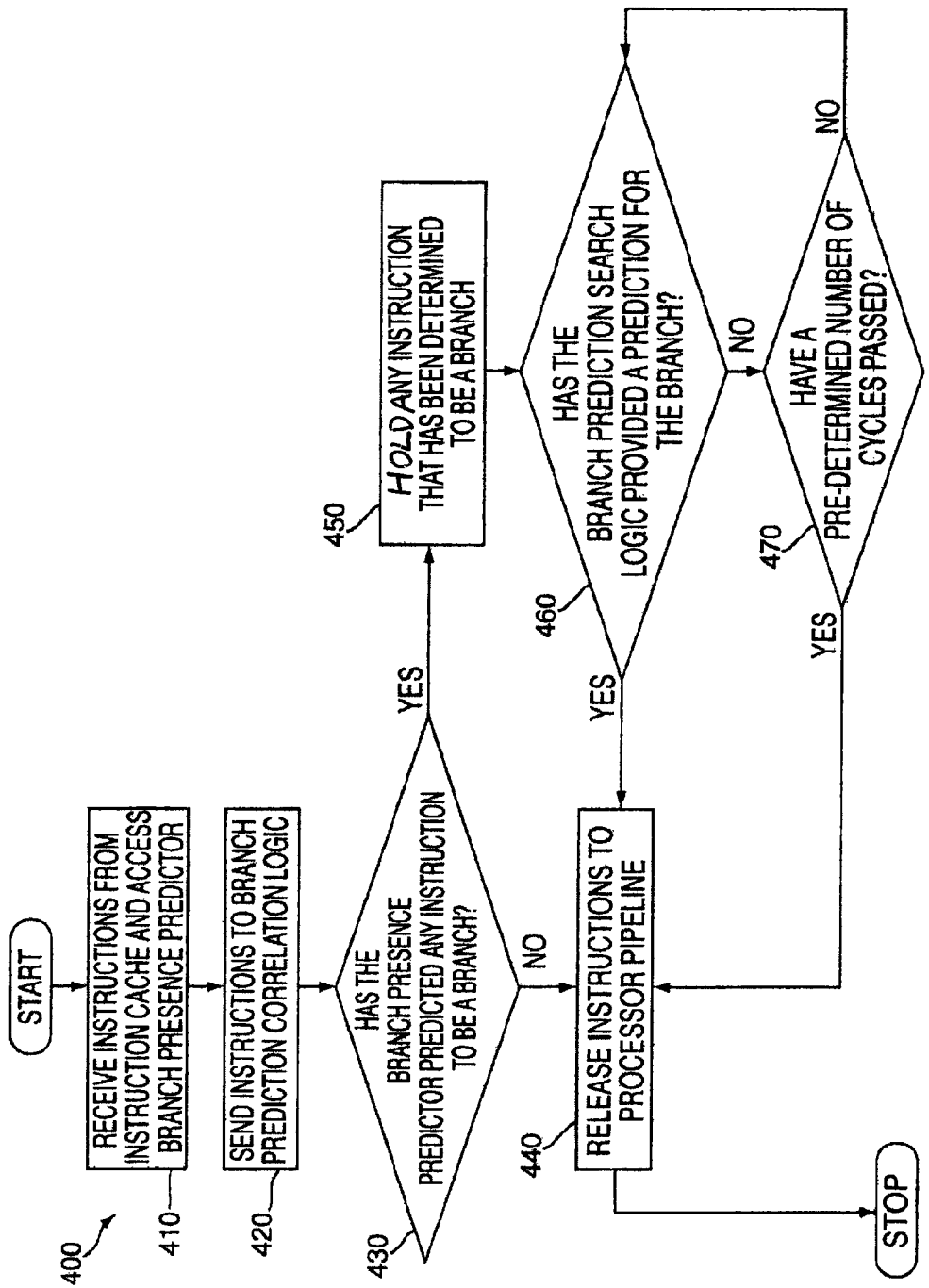
FIG. 4 illustrates a flow chart of a method for mitigating lookahead branch prediction latency with branch presence prediction at the time of instruction fetching in accordance with an exemplary embodiment.

FIG. 4 illustrates a flow chart of a method 400 for mitigating lookahead branch prediction latency with branch presence prediction at the time of instruction fetching in accordance with an exemplary embodiment. At block 410, instructions in the pipelines 200 are received from the instruction cache 310, and the BPP 320 is accessed. As such, encountered branch instructions that are predictable by the BTB 330 are also written into the BPP 320. In an exemplary embodiment, branches that are not written into the BTB 330—such as those that have never been taken in the past and are not likely to be taken—are never written into the BPP 320. In an exemplary embodiment, the writes into the BPP 320 can occur upon completing branch instructions. They can alternatively occur any time a branch instruction that would benefit from the BTB 330 is recognized. Recognition could occur due to finding such a branch anywhere in the pipeline 200—including at the branch prediction stage. Such a branch should also be guaranteed to already exist in the BTB 330 or be added to the BTB 330 co-currently with the write into the BPP 320 in order for it to be useful in the BPP 320. In an exemplary embodiment, it is desirable to avoid duplicate entries in the BPP 320. The BPP 320 is read in parallel with the instruction cache 310. As a function of the fetch address, it returns whether any of the instructions being fetched are in the BPP. At block 420, this information is sent to the branch prediction correlation logic 350.

In an exemplary embodiment, the branch prediction correlation logic 350 determines when an instruction may be sent into the processor's pipeline 200. At block 430, the BPP 320 determines whether the instruction has been predicted to be a branch. If an instruction has not been predicted to be a branch by the BPP 320 at block 430, then at block 440, the instruction can be released by a release signal sent from branch prediction correlation logic 350 to multiplexer 370. If, however, the instruction has been predicted by the BPP 320 at block 430, then at block 450, the BPP 320 has determined that the instruction has been predicted to be a branch. Since at block 450, the instruction is predicted by the BPP 320 to be a branch, then the Branch Prediction Correlation Logic 350 does not immediately release this instruction into the pipeline 200. The Correlation Logic 350 waits until either the branch prediction search logic 360 provides a prediction for the branch at block 460, or until a predetermined number of cycles pass at block 470 before releasing the instruction at block 440.

As a result of the summarized invention, the systems and methods and described herein provide a BPP that allows the BTB to catch up to fetching and instruction delivery. The accurate prediction from the BTB can be used instead of having to rely on a less accurate prediction. There is no additional need to re-steer the instruction fetching and branch prediction logic. Furthermore branches that have latency problems can be identified and therefore installed into any special mechanisms that may exist to prevent the latency problem on future occurrences of the branch.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a microprocessor with lookahead branch prediction, the microprocessor including a microprocessor pipeline having an instruction stream and a branch target buffer, a method for mitigating lookahead branch prediction latency, the method comprising:
   receiving an instruction address in an instruction cache for fetching instructions in the microprocessor pipeline;
   receiving the instruction address in a branch presence predictor coupled to the microprocessor pipeline;
   determining, by the branch presence predictor, presence of a branch instruction in the instructions being fetched, wherein the branch instruction is predictable by the branch target buffer, and any indication of the instruction address not written to the branch target buffer is also not written to the branch presence predictor;
   based on receipt of an indication that the branch instruction is present from the branch presence predictor, holding the branch instruction; and
   based on receipt of a branch prediction corresponding to the branch instruction from the branch target buffer, releasing said held branch instruction to the pipeline for execution.

2. The method as claimed in claim 1 further comprising determining an exact location within the instruction stream that corresponds to the branch instruction.

3. The method as claimed in claim 1 further comprising determining an approximate location within the instruction stream that corresponds to the branch instruction.

4. The method as claimed in claim 1 further comprising releasing an indication of valid instructions corresponding to the branch instruction to the pipeline from branch prediction correlation logic coupled to the branch presence predictor.

5. The method as claimed in claim 1 further comprising releasing an indication of a branch prediction corresponding to the branch instruction to the pipeline from branch prediction correlation logic coupled to the branch presence predictor.

6. The method as claimed in claim 1 wherein releasing the held branch instruction occurs after a receipt of a prediction for the branch instruction from branch prediction search logic coupled to the branch target buffer and to the pipeline.

7. The method as claimed in claim 1 further comprising releasing the held branch instruction after a passage of a predetermined number of cycles.

8. A system for mitigating lookahead branch prediction latency, the system comprising:
   a microprocessor with lookahead branch prediction, the microprocessor including a microprocessor pipeline having an instruction stream and a branch target buffer, the microprocessor performing:
   receiving an instruction address in an instruction cache for fetching instructions in the microprocessor pipeline;
   receiving the instruction address in a branch presence predictor coupled to the microprocessor pipeline;
   determining, by the branch presence predictor, presence of a branch instruction in the instructions being fetched, wherein the branch instruction is predictable by the branch target buffer, and any indication of the instruction address not written to the branch target buffer is also not written to the branch presence predictor;
   based on receipt of an indication that the branch instruction is present from the branch presence predictor, holding the branch instruction; and
   based on receipt of a branch prediction corresponding to the branch instruction from the branch target buffer, releasing said held branch instruction to the pipeline for execution.

9. The system as claimed in claim 8 further comprising determining an exact location within the instruction stream that corresponds to the a branch instruction.

10. The system as claimed in claim 8 further comprising determining an approximate location within the instruction stream that corresponds to the branch instruction.

11. The system as claimed in claim 8 further comprising releasing an indication of valid instructions corresponding to the branch instruction to the pipeline from branch prediction correlation logic coupled to the branch presence predictor.

12. The system as claimed in claim 8 releasing an indication of a branch prediction corresponding to the branch instruction to the pipeline from branch prediction correlation logic coupled to the branch presence predictor.

13. The system as claimed in claim 8 wherein releasing the held branch instruction occurs after a receipt of a prediction for the branch instruction from branch prediction search logic coupled to the branch target buffer and to the pipeline.

14. The system as claimed in claim 8 further comprising releasing the held branch instruction after a passage of a predetermined number of cycles.

15. A computer program product for implementing mitigation of lookahead branch prediction latency, the computer program product comprising:
   a non-transitory tangible storage medium readable by a processing circuit and storing instructions for execution by the processing circuit for performing a method comprising:
   receiving an instruction address in an instruction cache for fetching instructions in a microprocessor pipeline;
   receiving the instruction address in a branch presence predictor coupled to the microprocessor pipeline;
   determining, by the branch presence predictor, presence of a branch instruction in the instructions being fetched, wherein the branch instruction is predictable by a branch target buffer, and any indication of the instruction address not written to the branch target buffer is also not written to the branch presence predictor;

based on receipt of an indication that the branch instruction is present from the branch presence predictor, holding the branch instruction; and based on receipt of a branch prediction corresponding to the branch instruction from the branch target buffer, releasing said held branch instruction to the pipeline for execution.

16. The computer program product as claimed in claim 15 wherein the method further comprises determining at least one of an exact location and an approximate location within an instruction stream that corresponds to a the branch instruction.

17. The computer program product as claimed in claim 15 wherein the method further comprises releasing an indication of valid instructions corresponding to the branch instruction to the pipeline from branch prediction correlation logic coupled to the branch presence predictor.

18. The computer program product as claimed in claim 15 wherein the method further comprises releasing an indication of a branch prediction corresponding to the branch instruction to the pipeline from branch prediction correlation logic coupled to the branch presence predictor.

* * * * *